May 11, 1926.
E. G. LOVE
1,583,890
STEERING WHEEL LOCK
Filed June 28, 1924    2 Sheets-Sheet 1
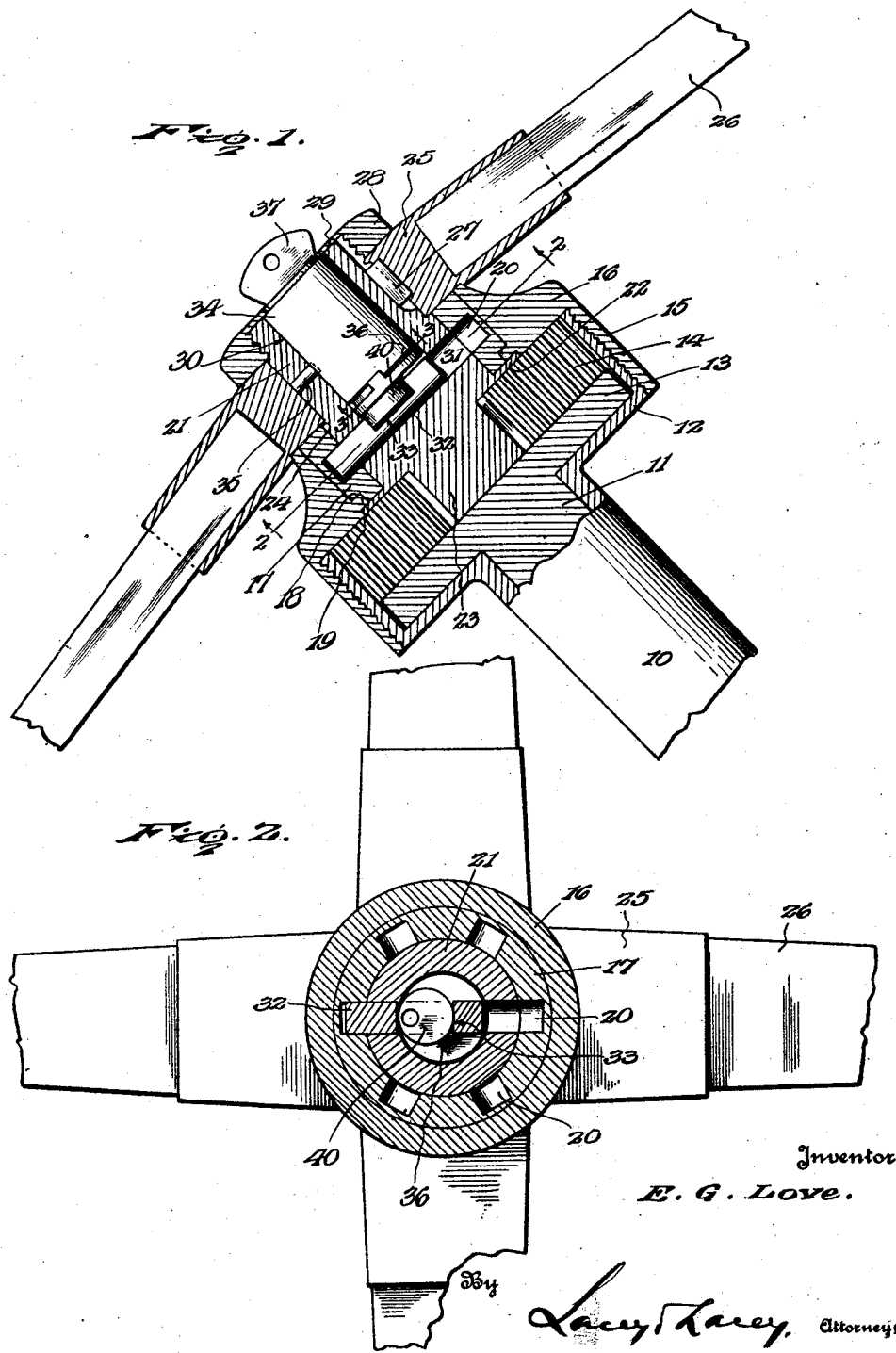
Inventor
E. G. Love.
By Lacey & Lacey, Attorneys May 11, 1926.  
E. G. LOVE  
STEERING WHEEL LOCK  
Filed June 28, 1924   2 Sheets-Sheet 2
1,583,890
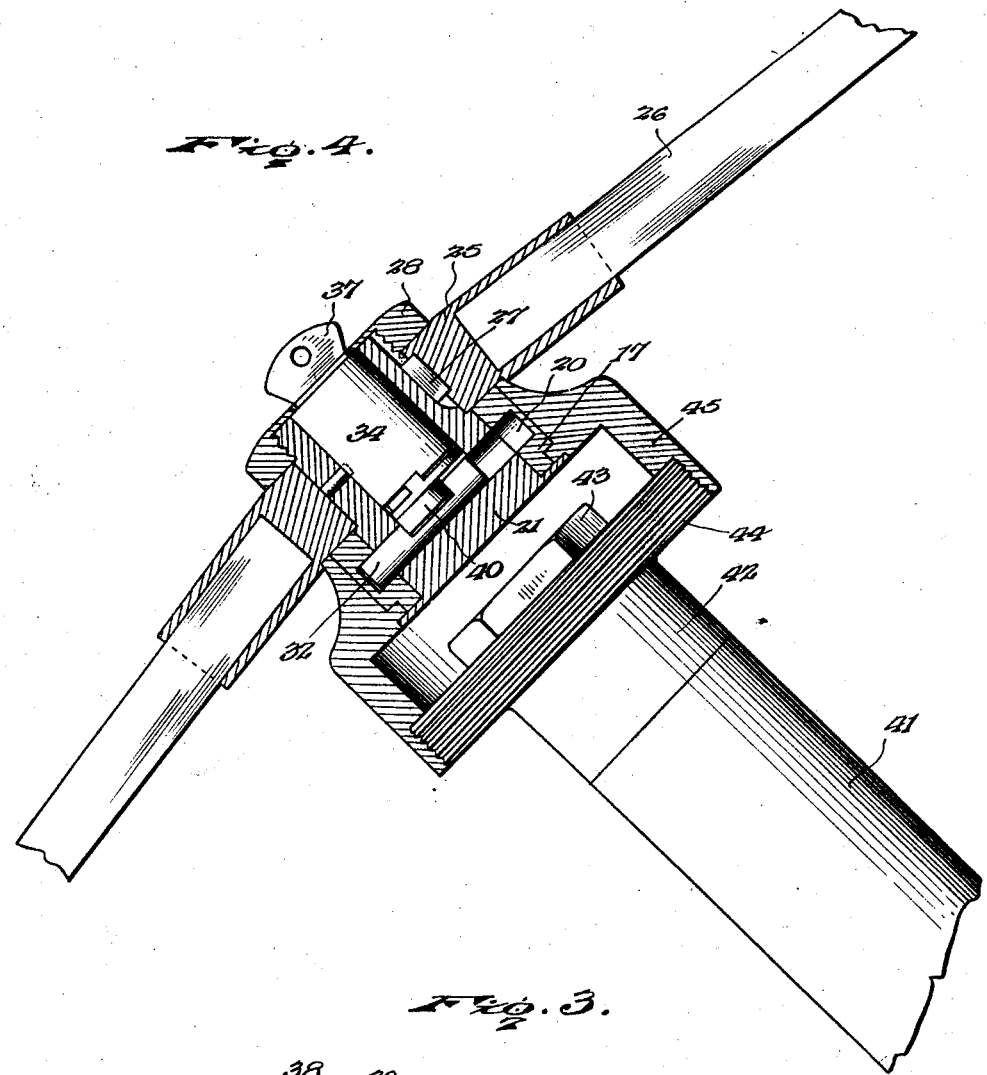
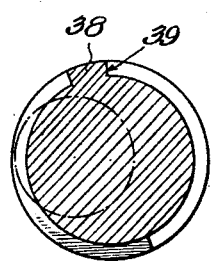
Inventor  
E. G. Love.  
By *Lacy Lacey*, Attorneys Patented May 11, 1926.

UNITED STATES PATENT OFFICE.

ERCLAT G. LOVE, OF WICHITA, KANSAS.

STEERING-WHEEL LOCK.

Application filed June 28, 1924. Serial No. 722,934.

This invention relates to an improved lock for motor vehicle steering gear and seeks to provide a mechanism wherein the lock structure is mounted axially of the steering wheel.

The invention further seeks to provide a lock mechanism which may be operated to effectually prevent the movement of the steering shaft by the steering wheel.

And the invention still further seeks to provide a mechanism of simple construction and which may be readily adapted to the steering columns of different makes of vehicles.

Other and incidental objects will appear hereinafter.

In the drawings:

Figure 1 is a sectional view showing one embodiment of the invention,

Figure 2 is a transverse sectional view on the line 2—2 of Figure 1, looking in the direction indicated by the arrows, Figure 3 is an enlarged detail sectional view on the line 3—3 of Figure 1, looking in the direction indicated by the arrows, and Figure 4 is a view similar to Figure 1, showing a slightly different embodiment of the invention.

Referring now more particularly to Figures 1, 2 and 3 of the drawings, I have shown a steering column at 10, which column is formed to journal a steering shaft 11 and is provided at its upper end with a housing 12 freely accommodating a flange 13 at the upper end of the shaft. Planetary gears 14 are journaled on said flange, all of this structure being well known. In accordance with the present invention, I provide a cover 15 which is screwed on the housing 12, supplanting the usual cover for said housing. At its upper end, the cover is thickened to form a sleeve 16 and pressed into said sleeve is a bushing 17 turned at its lower end to produce an external annular shoulder 18. Projecting from the sleeve is an internal annular flange 19 snugly receiving the reduced lower end of the bushing seating the shoulder 18, and, as brought out in Figure 2, the bushing is provided above the plane of said shoulder with an annular series of sockets 20.

Journaled through the bushing 17 is a spindle 21 inserted from the lower end of the bushing and provided at its lower extremity with an annular flange 22 rotatably fitting in a suitable recess at the lower end of the collar 16 to coact with the flange 19 of the collar. The flange 22 will thus limit the spindle against upward displacement and integrally formed on or otherwise secured to the lower end of the spindle is a gear 23 coacting with the planetary gears 14. At its upper end portion, the spindle is reduced to define an external annular shoulder 24 and fitting over the reduced upper end of the spindle to seat against said shoulder is the hub 25 of a steering wheel 26. As shown in Figure 1, the spindle is slotted at its upper end to accommodate a key 27 connecting the hub with the spindle and screwed upon the upper end of the spindle is a nut 28 clamping the hub against the shoulder 24, the nut being preferably provided with an annular flange 29 to overhang the upper end edge of the spindle.

At its upper end, the spindle 21 is formed with an axial bore 30, at the lower end of which is a diametric opening 31 through the spindle at the plane of the sockets 20 in the collar 17. Slidable in said opening is a cylindrical bolt 32 of a length equal to the diameter of the spindle and provided at its upper side with a notch 33. Fitting in the bore 30 of the spindle to lie flush with the upper end thereof is a lock 34 secured against displacement by a pin 35 and provided with a cylinder 36 operable by a key 37. The cylinder is, as shown in Figure 3, formed with a stop 38 to coact with shoulders 39 on the lock barrel for limiting the cylinder in its movement in opposite directions, and integrally formed on or otherwise secured to the cylinder at its lower end is an eccentric 40 fitting in the notch 33 of the bolt 32. Thus, as will be seen, the key 37 may be turned in one direction for rotating the lock cylinder and projecting the bolt 32 into one of the sockets 20 of the bushing 17 for locking the steering wheel 26 against rotation while, by turning the key 37 in the opposite direction, the bolt may be retracted into the opening 31 of the spindle 21, when the steering wheel may be freely turned for rotating the shaft 11, as will be understood, and guiding the vehicle.

In Figure 4 of the drawings, I have illustrated a slightly different embodiment of the invention. A conventional steering column is shown at 41 and fixed to the upper end of the steering shaft, which is journaled through the steering column, is a head 42 secured to the shaft by a nut 43 and provided with an annular flange 44.

Screwed over said flange is a cover 45 substantially identical with the cover 15 with the exception that the cover 45 is provided with a shorter threaded flange to engage the flange 44. Otherwise, this embodiment of the invention is substantially a counterpart of the prior embodiment thereof, the gear 23 being, however, eliminated, and as will be seen, when the bolt 32 is thrown, the steering wheel 26 will be locked to the cover 45 so that the steering wheel may be operated for rotating the cover and turning the head 42 to guide the vehicle. On the contrary, when the bolt is retracted, the steering wheel will be freed for movement independently of the cover so that the steering wheel cannot then be operated for rotating the steering shaft.

Having thus described the invention, what I claim is:

In a steering gear, the combination of a cover terminating at its outer end in a sleeve having an axial bore and provided near its inner end with an internal annular flange projecting into said bore, a bushing pressed into said bore and reduced at its inner end to fit through said flange as well as to define an annular shoulder seating against the flange for limiting the bushing against inward displacement, the bushing being provided with an internal socket, a spindle journaled through the bushing and provided at its inner end with an annular flange rotatably fitting in the inner end of said bore substantially flush with the inner end face of the sleeve to abut the inner edge of said bushing and said first mentioned flange for limiting the spindle against outward displacement, a steering wheel having a hub fixed to the outer end of the spindle to closely overlie the outer end edges of said bushing and sleeve whereby the bushing is limited against outward displacement by said hub and confined between the hub and the flange of the sleeve, a bolt shiftable upon the spindle to engage in said socket securing the spindle against rotation independently of the cover, and key controlled means mounted axially of the spindle for shifting said bolt.

In testimony whereof I affix my signature.

ERCLAT G. LOVE. [L. S.]